United States Patent
Hiwatashi et al.

(10) Patent No.: US 6,411,901 B1
(45) Date of Patent: Jun. 25, 2002

(54) VEHICULAR ACTIVE DRIVE ASSIST SYSTEM

(75) Inventors: Yutaka Hiwatashi; Keiji Hanawa, both of Mitaka (JP)

(73) Assignee: Fuji Jukogyo Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 09/665,104

(22) Filed: Sep. 20, 2000

(30) Foreign Application Priority Data

Sep. 22, 1999 (JP) .......................................... 11-269547

(51) Int. Cl.⁷ ................................................ G08G 1/16
(52) U.S. Cl. ........................ 701/301; 340/435; 340/903; 348/148
(58) Field of Search .......................... 701/96, 300, 301; 342/455; 340/435, 436, 901, 903; 348/118, 119, 142, 148, 149

(56) References Cited

U.S. PATENT DOCUMENTS

| | | | | |
|---|---|---|---|---|
| 5,699,057 A | * | 12/1997 | Ikeda et al. ................. | 340/903 |
| 5,765,116 A | * | 6/1998 | Wilson-Jones et al. ...... | 348/119 |
| 6,057,754 A | * | 5/2000 | Kinoshita et al. ........... | 340/436 |
| 6,172,600 B1 | * | 1/2001 | Kakinami et al. .......... | 348/148 |
| 6,226,592 B1 | * | 5/2001 | Luckscheiter et al. ...... | 701/301 |

* cited by examiner

*Primary Examiner*—Gary Chin
(74) *Attorney, Agent, or Firm*—Smith, Gambrell & Russell, LLP

(57) ABSTRACT

An easy-to-use vehicular active drive assist system is provided, which can continue to give a warning against the presence of a possibility of deviation of own vehicle from a traffic lane to such an extent that a driver would not find the warning noisy or annoying. A control unit makes a judgment on the possibility of deviation from a traffic lane based on the location of lane marker lines detected from a pair of camera images and the location of own vehicle, and generates a warning if the own vehicle is supposed to deviate from to the left or right of the traffic lane. This warning is produced at preset time intervals. When the direction of potential lane deviation has changed (from right to left or from left to right), a lane deviation warning of the current side of lane deviation is started immediately.

5 Claims, 4 Drawing Sheets

VEHICULAR ACTIVE DRIVE ASSIST SYSTEM

BACKGROUND OF THE INVENTION

1. Field of the Invention

The present invention relates to a vehicular active drive assist system which assists a driver in driving by properly generating a warning when there is a possibility that own vehicle runs deviating from a traffic lane.

2. Description of the Related Art

A comprehensive active drive assist system (ADA system) which actively assists a driver in driving operations has been developed in recent years in order to improve safety of vehicle. This ADA system estimates the possibility of various incidences, such as a collision with a vehicle running ahead, contact with an object and deviation from a traffic lane, from information on vehicle driving environments or running state of own vehicle and, when it is predicted that safety can not be maintained, alerts the driver or otherwise performs control operation.

While a laser radar system, for instance, has conventionally been known as a device for obtaining the aforementioned vehicle driving environment information, Japanese Patent Laid-Open No. 265547/1993 covering an application filed by the present applicant proposes an approach to obtain three-dimensional recognition of a road and traffic environments with practically sufficient accuracy and promptness by processing information on images of scenery and objects ahead of the vehicle captured by a plurality of cameras installed onboard.

Prevention of deviation from a traffic lane, one of functions of the aforementioned ADA system, is intended to alert the driver to an extremely close approach to or crossing of a lane marker line by producing a warning, for instance, should such a situation occur, and thereby help prevent traffic accidents which might be caused by a lack of attention, dozing, failure to watch ahead, or other behavior related to the driver's carelessness. Various proposals have already been made with respect to this lane deviation preventing function.

In the aforementioned lane deviation preventing function, warning to a driver is generally given in the form of the lighting or blinking of a warning lamp, the sounding of a warning buzzer or a chime, or voice, for example. Especially when the driver deviates from a traffic lane due to dozing, for instance, it is desirable that the warning be given continually by such warning unit. On the other hand, once the driver recognizes potential deviation from the traffic lane, the driver usually maneuvers his or her vehicle in a direction to prevent deviation from the traffic lane and, therefore, it may occasionally be undesirable to keep the warning activated after the driver has recognized the potential deviation from the traffic lane, because the driver could find it rather noisy or annoying.

SUMMARY OF THE INVENTION

The invention has been made in consideration of the foregoing circumstances. Accordingly, it is an object of the invention to provide an easy-to-use vehicular active drive assist system which can continue to give a warning against the presence of a possibility of deviation of own vehicle from a traffic lane to such an extent that a driver would not find the warning noisy or annoying.

To achieve the aforementioned object, a vehicular active drive according to the invention comprises a lane deviation judgment unit which judges the possibility of deviation of own vehicle from a traffic lane on a roadway ahead, and a warning control unit which activates a warning generating unit when the own vehicle is judged to have the possibility of deviation from the traffic lane, wherein the warning control unit activates the warning generating unit at preset time intervals as long as the judgment persists after the own vehicle has been judged to have the possibility of deviation from the traffic lane. As a result, it is possible to repeatedly produce a warning against the deviation from the traffic lane to such an extent that a driver would not find the warning noisy or annoying.

In the vehicular active drive assist system of the invention, the lane deviation judgment unit distinctively judges the possibility of deviation to the left and right directions of the traffic lane, and if the own vehicle is judged to have the possibility of deviation from the traffic lane in one of its left and right directions after once having been judged to have the possibility of deviation from the traffic lane in. the opposite direction, the warning control unit immediately activates the warning generating unit regardless of the time interval counted for the opposite direction. For example, if the possibility of deviation to the right of the traffic lane arises while the warning generating unit is being activated and producing the warning due to the presence of the possibility of deviation to the left of the traffic lane, the warning generating unit is immediately activated and the warning is generated. Therefore, it is possible to properly warn the driver of the possibility of deviation from the traffic lane again to assist the driver in driving even when the driver suddenly manipulates a steering wheel to avoid deviation from the traffic lane.

Further, in the vehicular active drive assist system of the invention, wherein the lane deviation judgment unit distinctively judges the possibility of deviation to the left and right directions of the traffic lane, and if the own vehicle is judged to have no possibility of deviation from the traffic lane after once having been judged to have the possibility of deviation in one of its left and right directions, and is judged again to have the possibility of deviation from the traffic lane in the same direction, the warning control unit immediately activates the warning generating unit regardless of the time interval initially counted for that direction. For example, if the possibility of deviation to the left of the traffic lane once disappears while the warning generating unit is being activated and producing the warning due to the presence of the possibility of deviation to the left of the traffic lane and the possibility of deviation to the left of the traffic lane arises again, the warning generating unit is activated and the warning is generated immediately. Therefore, even when the driver once takes action to avoid deviation from the traffic lane and then repeats the same steering action, it is possible to properly warn the driver of the possibility of deviation from the traffic lane again to assist the driver in driving.

DESCRIPTION OF THE PREFERRED EMBODIMENTS

An embodiment of the present invention is described below with reference to drawings.

Figure 1:
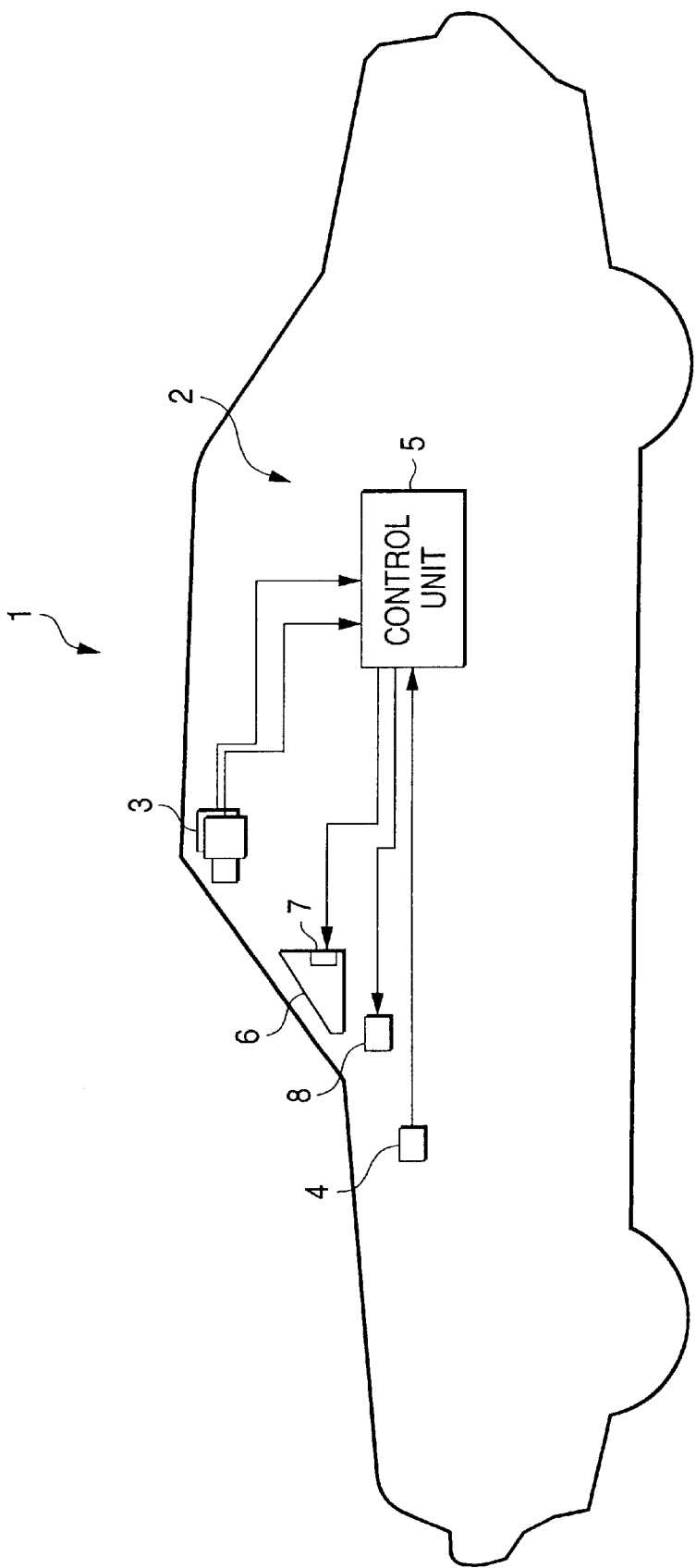
FIG. 1 is a schematic configuration diagram of a vehicular active drive assist system.
Figure 2:
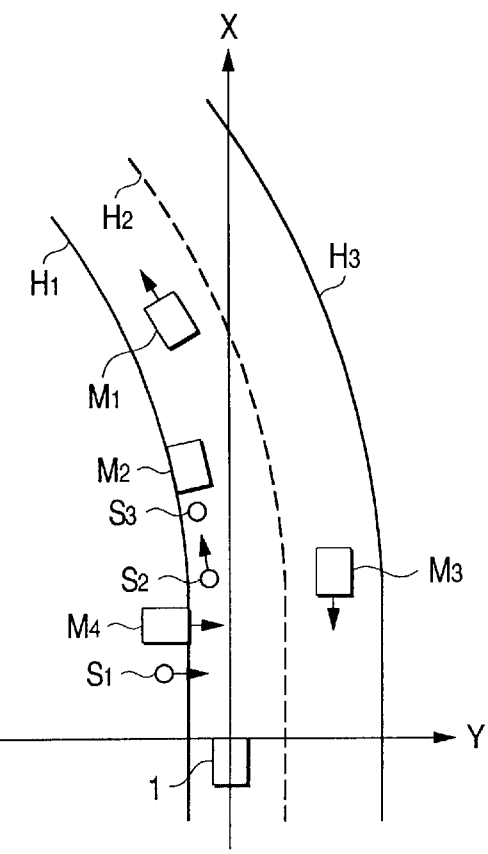
FIG. 2 is an explanatory diagram concerning data detected ahead.
Figure 3:
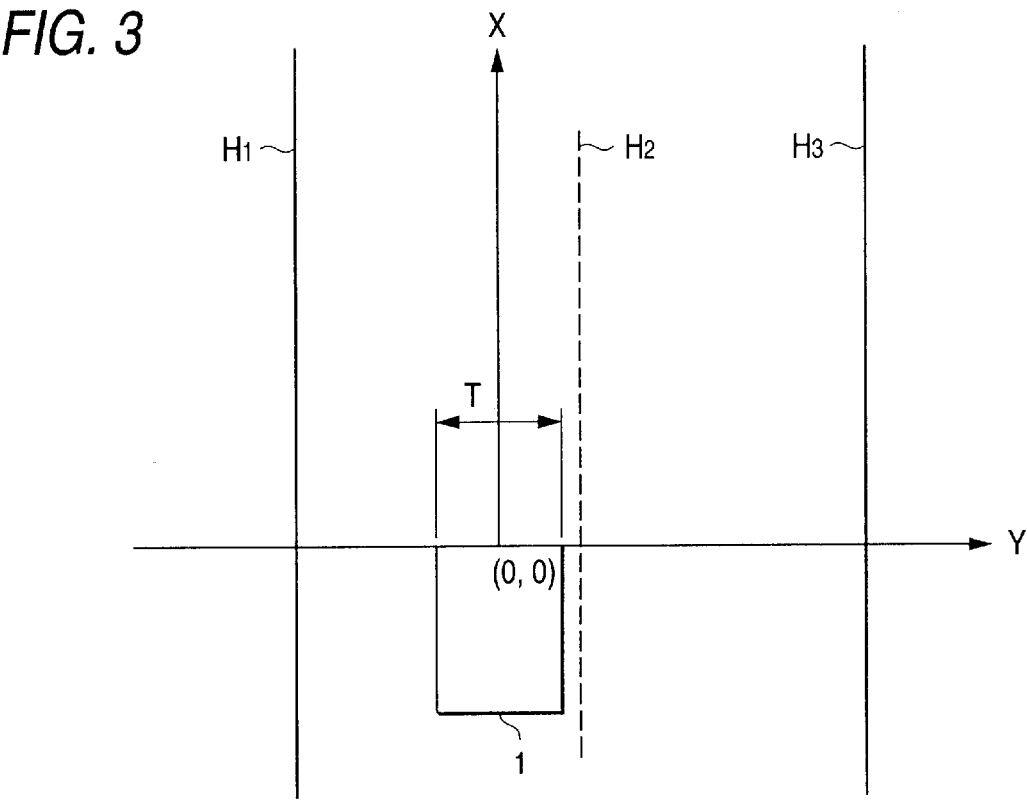
FIG. 3 is an explanatory diagram concerning judgment about deviation from a traffic lane.
Figure 4:
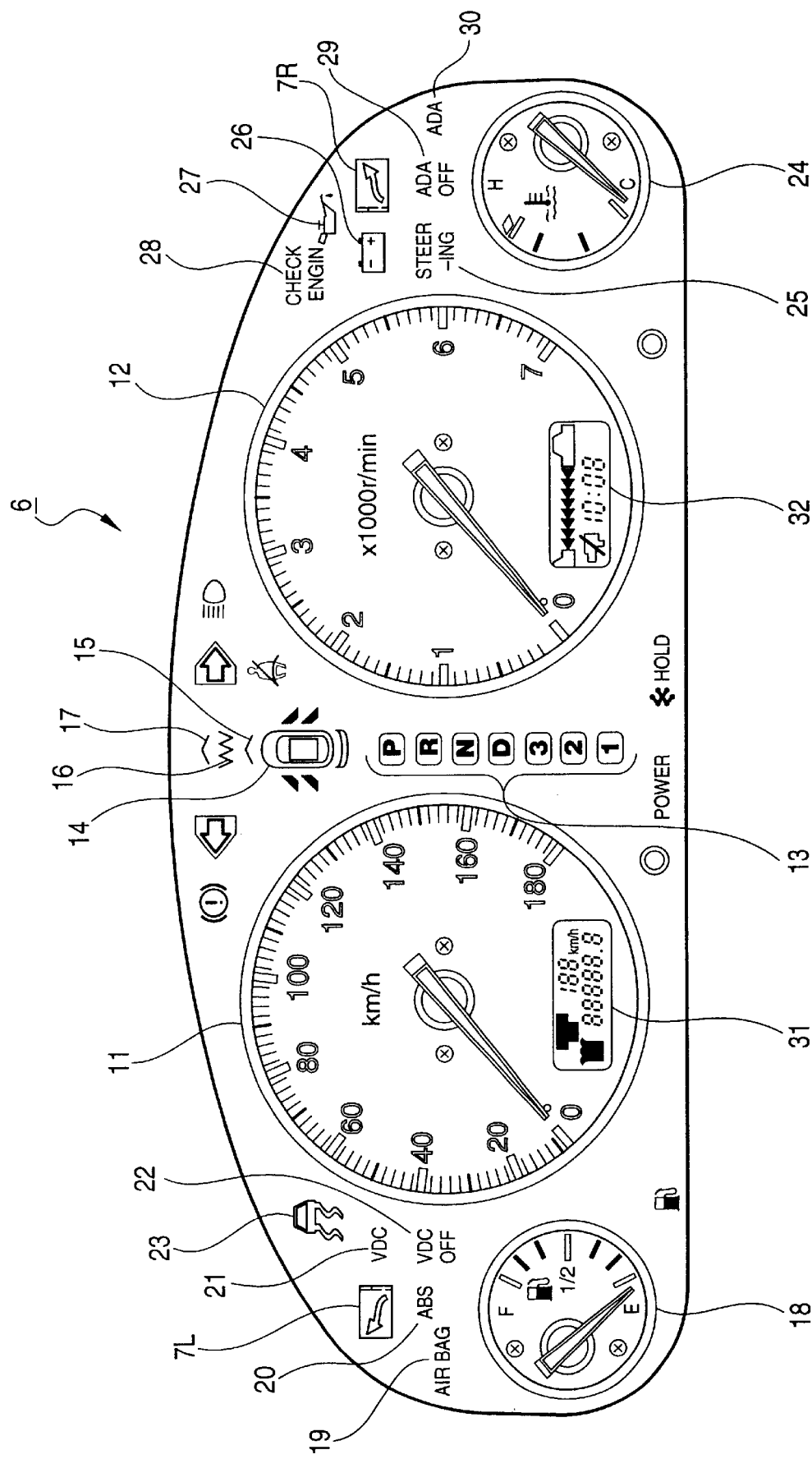
FIG. 4 is an explanatory diagram of a combination meter.
Figure 5:
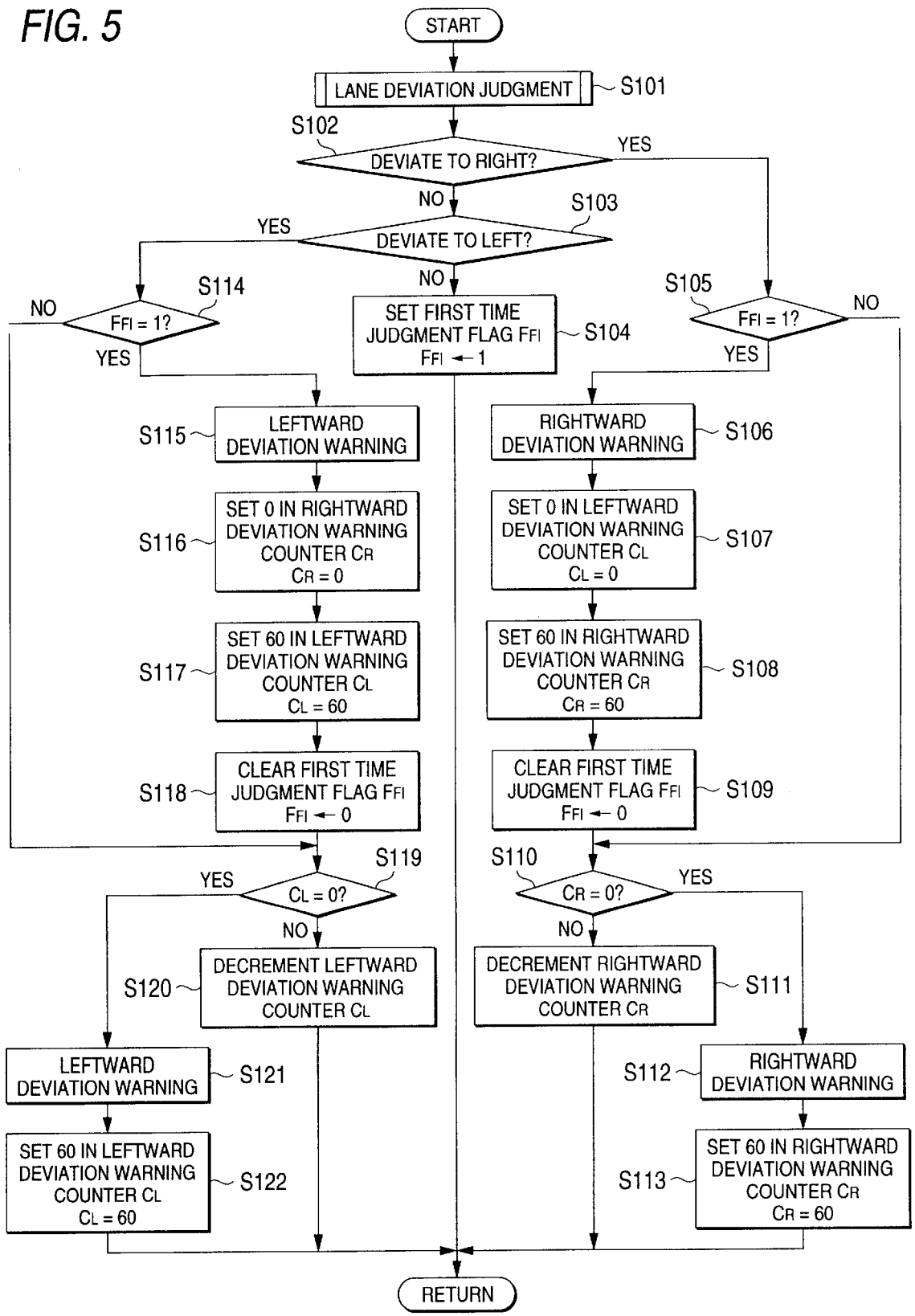
FIG. 5 is a flowchart showing lane deviation preventive control operation.

FIGS. 1 to 5 show the embodiment of the invention, in which FIG. 1 is a schematic configuration diagram of a vehicular active drive assist system; FIG. 2 is an explanatory diagram concerning data detected ahead; FIG. 3 is an explanatory diagram concerning judgment about deviation from a traffic lane; FIG. 4 is an explanatory diagram of a combination meter; and FIG. 5 is a flowchart showing lane deviation preventive control operation.

Referring to FIG. 1, the reference numeral 1 designates a vehicle (own vehicle) like a motor vehicle. Installed on this own vehicle 1 is a vehicular active drive assist system (ADA system) 2 having as its one function the so-called lane deviation preventing function which alerts a driver to an extremely close approach to or crossing of a lane marker line by producing a warning, for instance, should such a situation occur, and thereby help prevent traffic accidents which might be caused by dozing, failure to watch ahead, or other behavior related to the driver's carelessness. The following discussion of the present invention deals only with the lane deviation preventing function of the aforementioned ADA system 2 and a description of its other functions is omitted.

The aforementioned ADA system 2 has a pair of (left and right) CCD cameras 3 using solid-state image pickup devices, such as charge-coupled devices (CCDs) as a stereoscopic optical system. These left and right CCD cameras 3 are installed with a specific distance from each other at a forward part of a ceiling within the vehicle's passenger compartment so that they can take stereoscopic photographs of a subject outside the vehicle from different points of view.

The vehicle 1 is further provided with a vehicle speed sensor 4 which detects vehicle speed V. The ADA system 2 is constructed such that the vehicle speed V detected by the vehicle speed sensor 4 and images in a running direction of the own vehicle 1 photographed by the aforementioned pair of the CCD cameras 3 are entered to a control unit 5.

The images in the running direction of the own vehicle 1 and the vehicle speed V are entered to the aforementioned control unit 5, and the control unit 5 makes a judgment on the possibility of deviation of the own vehicle 1 from a traffic lane on a roadway ahead. If the control unit 5 judges that there is a possibility that the own vehicle 1 may deviate from its current traffic lane, the control unit 5 activates one of warning lamps 7 on a combination meter 6 and a warning buzzer 8 as a warning generating unit, as will be later described.

The aforementioned control unit 5 is made of a multi-microprocessor system having an image processor and has a function as a lane deviation judgment unit, which generates a distance image representative of a three-dimensional distance distribution by performing a processing operation on a pair of stereoscopic images photographed by the aforementioned pair of the CCD cameras 3 to obtain distance information on the entire images from the amount of deviation of each corresponding point on the images using the principle of triangulation, extracts necessary information by processing the distance image, and judges the possibility of deviation of the own vehicle 1 from the roadway ahead on the basis of the information extracted.

More specifically, the control unit 5 separates and detects lane marker lines, vehicles and objects other than the vehicles from the aforementioned distance image and thereby obtains image data on road and the objects. In the case of a two-lane road, for example, the control unit 5 obtains, from this image data, data concerning coordinates representative of the location and shapes of left, right and central white lines H1-H3 ahead of the own vehicle 1, coordinates of the positions and velocity vectors of a preceding vehicle M1 and a parked vehicle M2 on the current traffic lane (own traffic lane) of the own vehicle 1, those of an oncoming vehicle M3 on an opposite traffic lane, and those of a crossing vehicle M4, a crossing person S1, a pedestrian S2, another object S3, and so on an X-Y coordinate system referenced to the position and moving direction of the own vehicle 1 as shown in FIG. 2.

The locations of the white lines H1 and H2 on the left and right of the. own traffic lane ahead-are compared with a reference point (coordinates (0, 0)) taken at the location of the own vehicle 1, and the possibility of deviation from the traffic lane is judged based on results of comparison. For example, it is judged that there is a possibility of deviation to the left side of the traffic lane if the white line H1 is not on the outside (left side) of a distance T/2 at about 10 m ahead, where T is the width of the own vehicle 1 as shown in FIG. 3. Similarly, if the white line H2 is not on the outside (right side) of a distance T/2 at about 10 m ahead, it is judged that there is a possibility of deviation to the right side of the traffic lane.

The aforementioned control unit 5 has a function as a warning control unit. When the own vehicle 1 deviates from the traffic lane in one direction, the control unit 5 produces a warning at preset time intervals (e.g., 6-second intervals), and when the direction of deviation from the traffic lane has changed (e.g., from right to left or from left to right), the control unit 5 immediately activates a lane deviation warning of the current side of deviation based on results of judgment on the possibility of deviation from the traffic lane according to the flowchart of the later-described lane deviation preventive control operation. As an example, if the own vehicle 1 deviates to the left side of the traffic lane from a state of rightward lane deviation, the warning indicating leftward lane deviation is started immediately when the own vehicle 1 deviates to the left side even during the 6-second warning interval (non-warning period). This warning is produced differently according to the vehicle speed, for example. Specifically, generation of the warning is controlled such that it is given by one warning lamp 7 only when the vehicle speed V is between 40 km/h and 50 km/h and by both the warning lamp 7 and the warning buzzer 8 when the vehicle speed V is equal to 50 km/h or above.

The aforementioned ADA system 2 installed on the own vehicle 1 also has such functions as a vehicle-to-vehicle distance warning function which helps prevent a collision with a vehicle running ahead and an automatic cruise function which enables safe drive following the vehicle running ahead, besides the aforementioned lane deviation preventing function.

Accordingly, a speedometer 11 and a tachometer 12 are arranged at the left and right on the combination meter 6 of the own vehicle 1 and an AT position indicator 13 for indicating shift select positions is provided between the speedometer 11 and the tachometer 12 as shown in FIG. 4.

There is provided an unclosed door monitor 14 above the AT position indicator 13, and indicators related to the ADA system 2 including an indicator light 15 for indicating cruise set and preceding vehicle lock statuses, a vehicle-to-vehicle distance warning light 16 and a preceding vehicle lock blinker light 17 are arranged in this order above the unclosed door monitor 14.

Further, a fuel meter 18 is provided to the left of the aforementioned speedometer 11, and an air bag warning light 19, an antilock. warning light 20, a VDC warning light 21 for a VDC system which controls vehicle behavior by automatic brakes, a VDC OFF indicator 22 and a VDC ON indicator 23 are disposed above the fuel meter 18.

Disposed at an upper-left part of these indicators and warning lights is a leftward lane deviation warning light 7L which constitutes the earlier-mentioned warning lamps 7 and is lit when the own vehicle 1 deviates from the traffic lane to the left side.

Further, a water temperature gauge 24 is provided to the right of the aforementioned tachometer 12, and a steering warning light 25, a charge warning light 26, an oil pressure indicator 27 and a check-engine indicator 28 are provided above the water temperature gauge 24. Also provided together with these indicators and warning lights are an ADA system OFF indicator 29 and an ADA system failure warning light 30 which are related to the ADA system 2.

Disposed at an upper-right part of these indicators and warning lights is a rightward lane deviation warning light 7R which constitutes the earlier-mentioned warning lamps 7 and is lit when the own vehicle 1 deviates from the traffic lane to the right side.

A total mileage/trip odometer 31 using a liquid crystal display for indicating traveled distances obtained by integrating a signal from the vehicle speed sensor is provided in the aforementioned speedometer 11, while a camera recognition/vehicle-to-vehicle distance indicator 32 using a liquid crystal display related to the ADA system 2 is provided in the aforementioned tachometer 12.

The lane deviation preventing function achieved by the aforementioned construction is now described referring to the flowchart of the lane deviation preventive control operation shown in FIG. 5. A program of the lane deviation preventive control operation is cyclically executed at intervals of 100 ms, for instance, for a specific period of time. First, a lane deviation judgment for own vehicle 1 is made in step (hereinafter referred to simply as S) 101, and one of results that there is no possibility of deviation from the traffic lane, there is a possibility of deviation to the right of the traffic lane, or there is a possibility of deviation to the left of the traffic lane is obtained.

For ease of understanding, the following processing operation is explained separately for individual cases, that is, a case where there is no possibility of deviation, a case where there is a possibility of deviation to the right, and a case where system status changes from the presence of a possibility of deviation to the right to the presence of a possibility of deviation to the left.

First, in the case where the result that there is no possibility of deviation has been obtained in S101, a judgment is made in S102 as to whether the own vehicle 1 will deviate to the right or not. The result of this judgment is NO and the operation flow proceeds to S103.

In S103, a judgment is made as to whether the own vehicle 1 is going to deviate to the left or not. The result of this judgment is NO and the operation flow proceeds to S104, in which a first time judgment flag FFI is set (FFI←1), and the operation flow exits the program. In summary, FFI←1 is set when the own vehicle 1 does not deviate to either the left or right. FFI←1 is always set while the direction of lane deviation is changing from one side to the other (from right to left or from left to right) as well.

Next, when the result that there is a possibility of deviation to the right is obtained in S101, the judgment result in S102 above is YES and the operation flow proceeds to S105.

S105 is a processing step for judging whether the current warning state is a first one with reference to the first time judgment flag FFI. If FFI←1 and the current warning state is judged to be the first one, the operation flow proceeds to S106, in which a rightward deviation warning is generated to alert that there is a possibility of deviation to the right of the traffic lane. This warning is given by lighting the rightward lane deviation warning light 7R of the warning lamps 7, for example.

Next, the operation flow proceeds to S107 to set 0 in a leftward deviation warning counter CL (CL=0), and to S108 to set 60 in a rightward deviation warning counter CR (CR=60). The operation flow further proceeds to S109, in which the first time judgment flag FFI is cleared (FFI←0) to indicate that processing operation of the first time has been finished. Then, the operation flow proceeds to S110.

In S110, a judgment is made to determine whether CR=0. Since CR=60 is set in S108 above in the case of the first time, the judgment result in S110 is NO and the operation flow proceeds to S111, in which the rightward deviation warning counter CR is decremented, and the operation flow exits the program.

If this is not the first time, the operation flow jumps from S105 above to S110 above. Then, if CR is not equal to 0 (CR≠0), the operation flow proceeds to S111 to decrement the rightward deviation warning counter CR. After this decrement operation has been executed repeatedly until CR becomes equal to 0 (in about 6 seconds), the operation flow proceeds from S110 to S112, in which the rightward deviation warning is generated again to alert that there is a possibility of deviation to the right of the traffic lane. Subsequently, the operation flow proceeds to S113, in which 60 is set in the rightward deviation warning counter CR again, and the operation flow exits the program.

Thus, the warning is generated at 6-second intervals and, as a consequence, the present ADA system 2 becomes an easy-to-use system which can continue to give the warning against the presence of the possibility of deviation of own vehicle from the traffic lane to such an extent that the driver would not find the warning noisy or annoying.

Next, the aforementioned case where the system status changes from the presence of a possibility of deviation to the right of the traffic lane to the presence of a possibility of deviation to the left of the traffic lane is explained. Since the system status always changes through a situation where there is no possibility of deviation (S102, S103 through to S104 above) in this case, FFI←1 is set when the own vehicle 1 begins to deviate to the left of the traffic lane.

When the own vehicle 1 begins to deviate to the left of the traffic lane, the judgment result in S102 (deviate to right) is NO and the operation flow proceeds to S103. Since the own vehicle 1 deviates to the left of the traffic lane, the judgment result in S103 (deviate to left) is YES and the operation flow proceeds to S114.

S114 is a processing step for judging whether the current warning state is a first one with reference to the first time judgment flag FFI. If FFI←1 and the current warning state is judged to be the first one, the operation flow proceeds to S115, in which a leftward deviation warning is generated to alert that there is a possibility of deviation to the left of the traffic lane. This warning is given by lighting the leftward lane deviation warning light 7L of the warning lamps 7, for example. Therefore, whatever count value the rightward deviation warning counter. CR has, or in other words, even when 6 seconds have not elapsed from the warning against rightward lane deviation, the warning is produced immediately against leftward lane deviation.

Next, the operation flow proceeds to S116 to set 0 in the rightward deviation warning counter CR (CR=0) which has still been counting, and to S117 to set 60 in the leftward deviation warning counter CL (CL=60). The operation flow further proceeds to S118, in which the first time judgment flag FFI is cleared (FFI←0) to indicate that processing operation of the first time has been finished. Then, the operation flow proceeds to S119.

In S119, a judgment is made to determine whether CL=0. Since CL=60 is set in S117 above in the case of the first time, the judgment result in S119 is NO and the operation flow proceeds to S120, in which the leftward deviation warning counter CL is decremented, and the operation flow exits the program.

If this is not the first time, the operation flow jumps from S114 above to S119 above. Then, if CL is not equal to 0 (CL≠0), the operation flow proceeds to S120 to decrement the leftward deviation warning counter CL. After this decrement operation has been executed repeatedly until CL becomes equal to 0 (in about 6 seconds), the operation flow proceeds from S119 to S121, in which the leftward deviation warning is generated again to alert that there is a possibility of deviation to the left of the traffic lane. Subsequently, the operation flow proceeds to S122, in which 60 is set in the leftward deviation warning counter CL again, and the operation flow exits the program.

Thus, the warning is generated at 6-second intervals while a state of leftward lane deviation persists and, as a consequence, the present ADA system 2 becomes an easy-to-use system which can continue to give the warning against the presence of the possibility of deviation of own vehicle from the traffic lane to such an extent that the driver would not find the warning noisy or annoying.

Similarly, in a case where the system status changes from the presence of a possibility of deviation to the left of the traffic lane to the presence of a possibility of deviation to the right of the traffic lane, the system status always changes through a situation where there is no possibility of deviation (S102, S103 through to S104 above), so that FFI←1 is set when the own vehicle 1 begins to deviate to the right of the traffic lane and the operation flow proceeds from S102 to the processing steps shown in S105 and onwards. The warning is produced immediately in this case too whatever count value the leftward deviation warning counter CL has, or in other words, even when 6 seconds have not elapsed from the warning against leftward lane deviation.

Since the warning is produced immediately when the direction of lane deviation changes from one side to the other as seen above, it is possible to properly warn the driver of a new possibility of deviation from the traffic lane to assist the driver in driving and to effectively prevent excessive steering for avoiding deviation from the traffic lane even when he or she suddenly manipulates a steering wheel to avoid deviation from the traffic lane.

If the own vehicle is judged to have no possibility of deviation from the traffic lane after once having been judged to have the possibility of deviation in one of its left and right directions, and is judged again to have the possibility of deviation from the traffic lane in the same direction, the warning is immediately generated regardless of the time interval initially counted for that direction. For example, if the possibility of deviation to the left of the traffic lane once disappears while the warning generating unit is being activated and producing the warning due to the presence of the possibility of deviation to the left of the traffic lane and the possibility of deviation to the left of the traffic lane arises again, the warning against leftward lane deviation is produced immediately. Therefore, even when the driver once takes action to avoid deviation from the traffic lane and then repeats the same steering action, it is possible to properly warn the driver of the possibility of deviation from the traffic lane again to assist the driver in driving.

Although the possibility of deviation from the traffic lane is judged based on the location of the lane marker lines detected from a pair of camera images and the location of the own vehicle in the present embodiment, the possibility of deviation from the traffic lane may be judged by using other methods, such as a radar.

As thus far described, when own vehicle has been judged to have the possibility of deviation from a traffic lane, a warning is generated at preset time intervals as long as the same judgment persists according to the present invention. Therefore, the invention provides such an advantageous effect that it is possible to continually alert a driver to the presence of the possibility of deviation of the own vehicle from the traffic lane to such an extent that the driver would not find the warning noisy or annoying.

Also, when the own vehicle is judged to have the possibility of deviation from the traffic lane in one of its left and right directions after once having been judged to have the possibility of deviation from the traffic lane in the opposite direction, the warning is immediately generated against the current possibility of deviation from the traffic lane according to the invention. Therefore, even when the driver suddenly manipulates a steering wheel to avoid deviation from the traffic lane, it is possible to properly warn the driver of a new possibility of deviation from the traffic lane to assist the driver in driving and to effectively prevent excessive steering for avoiding deviation from the traffic lane.

Furthermore, when the own vehicle is judged to have no possibility of deviation from the traffic lane after once having been judged to have the possibility of deviation in one of its left and right directions, and is judged again to have the possibility of deviation from the traffic lane in the same direction, the warning is immediately generated regardless of the time interval initially counted for that direction according to the invention. Therefore, even when the driver once takes action to avoid deviation from the traffic lane and then repeats the same steering action, it is possible to properly warn the driver of the possibility of deviation from the traffic lane again to assist the driver in driving.

While the presently preferred embodiments of the present invention have been shown and described, it is to be understood that the disclosure is for the purpose of illustration and that various changes and modifications may be made without departing from the scope of the invention as set forth in the appended claims.

What is claimed is:

1. A vehicular active drive assist system, for a vehicle comprising:
   a lane deviation judgment unit which judges the possibility of deviation of said vehicle from a traffic lane on a roadway ahead;
   a warning generating unit which generates a warning to alert the possibility of deviation;
   a warning control unit which activates the warning generating unit when said vehicle is judged to have the possibility of deviation from the traffic lane; and
   a deviation waning counter unit which counts a preset time interval after the warning generating unit has been activated, said warning control unit activating the warning generating unit at the preset time interval as long as the judgment persists after said vehicle has been judged to have the possibility of deviation from the traffic lane.

2. A vehicular active drive assist system for a vehicle, comprising:

a lane deviation judgment unit which judges the possibility of deviation of said vehicle from a traffic lane on a roadway ahead, and a warning control unit which activates a warning generating unit when the said vehicle is judged to have the possibility of deviation from the traffic lane, said warning control unit activating the warning generating unit at preset time interval as long as the judgment persists after said vehicle has been judged to have the possibility of deviation from the traffic lane, wherein the lane deviation judgment unit distinctively judges the possibility of deviation to the left and right directions of the traffic lane, and if said vehicle is judged to have the possibility of deviation from the traffic lane in one of left and right directions after once having been judged to have the possibility of deviation from the traffic lane in the opposite direction, the warning control unit immediately activating the warning generating unit regardless of the time interval counted for the opposite direction.

3. A vehicular active drive assist system for a vehicle, comprising:

a lane deviation judgment unit which judges the possibility of deviation of said vehicle from a traffic lane on a roadway ahead; and a warning control unit which activates a warning generating unit when said vehicle is judged to have the possibility of deviation from the traffic lane, said warning control unit activating the warning generating unit at preset time interval as long as the judgment persists after said vehicle has been judged to have the possibility of deviation from the traffic lane, wherein the lane deviation judgment unit distinctively judges the possibility of deviation to the left and right directions of the traffic lane, and if said vehicle is judged to have no possibility of deviation from the traffic lane after once having been judged to have the possibility of deviation in one of left and right directions, and is judged again to have the possibility of deviation from the traffic lane in the same direction, the warning control unit immediately activating the warning generating unit regardless of the time interval initially counted for that direction.

4. The vehicular active drive assist system as recited in claim 1, wherein the deviation warning counter unit includes a rightward deviation warning counter for counting the preset time interval for rightward deviation warning, and a leftward deviation warning counter for counting the preset time interval for leftward deviation warning.

5. The vehicular active drive assist system as recited in claim 4, wherein when one of the deviation warning counter unit is set for counting the preset time interval, the other one of the deviation warning counter unit is set clear.

* * * * *